United States Patent
Tong et al.

(10) Patent No.: US 6,779,799 B2
(45) Date of Patent: Aug. 24, 2004

(54) SEALING APPARATUS FOR ELECTRICAL GENERATOR VENTILATION SYSTEM

(75) Inventors: Wei Tong, Clifton Park, NY (US); Thomas Arthur Wagner, Troy, NY (US); Zhangqing Zhuo, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/305,181

(22) Filed: Nov. 27, 2002

(65) Prior Publication Data

US 2004/0100033 A1 May 27, 2004

(51) Int. Cl.$^7$ .............................................. F01D 11/02
(52) U.S. Cl. ...................... 277/411; 277/355; 277/412
(58) Field of Search ................................. 277/355, 411, 277/412, 409, 347, 350

(56) References Cited

U.S. PATENT DOCUMENTS

| | | | | |
|---|---|---|---|---|
| 5,944,320 A | * | 8/1999 | Werner et al. .............. 277/355 |
| 5,971,400 A | * | 10/1999 | Turnquist et al. .......... 277/416 |
| 6,027,121 A | | 2/2000 | Cromer et al. | |
| 6,030,175 A | | 2/2000 | Bagepalli et al. | |
| 6,045,134 A | * | 4/2000 | Turnquist et al. .......... 277/347 |
| 6,105,967 A | * | 8/2000 | Turnquist et al. .......... 277/355 |
| 6,131,910 A | * | 10/2000 | Bagepalli et al. .......... 277/355 |
| 6,139,018 A | * | 10/2000 | Cromer et al. .............. 277/355 |
| 6,139,019 A | * | 10/2000 | Dinc et al. .................. 277/355 |
| 6,250,640 B1 | * | 6/2001 | Wolfe et al. ................ 277/355 |
| 6,257,586 B1 | * | 7/2001 | Skinner et al. ............. 277/303 |
| 6,286,211 B1 | * | 9/2001 | Turnquist et al. .......... 29/888.3 |
| 6,308,958 B1 | * | 10/2001 | Turnquist et al. .......... 277/355 |
| 6,328,311 B1 | * | 12/2001 | Plona et al. ................ 277/355 |
| 6,331,006 B1 | * | 12/2001 | Baily et al. ................. 277/355 |
| 6,367,806 B1 | * | 4/2002 | Turnquist et al. .......... 277/355 |
| 6,390,476 B1 | * | 5/2002 | Tong et al. ................. 277/355 |
| 6,396,176 B1 | | 5/2002 | Mokri | |
| 6,435,513 B2 | * | 8/2002 | Skinner et al. ............. 277/303 |
| 6,502,823 B1 | * | 1/2003 | Turnquist et al. .......... 277/355 |
| 6,550,777 B2 | * | 4/2003 | Turnquist et al. .......... 277/355 |
| 6,572,115 B1 | * | 6/2003 | Sarshar et al. ............. 277/412 |
| 6,612,581 B2 | * | 9/2003 | Bhate et al. ................ 277/355 |
| 6,644,667 B2 | * | 11/2003 | Grondahl .................... 277/355 |

* cited by examiner

Primary Examiner—William L. Miller
(74) Attorney, Agent, or Firm—Nixon & Vanderhye

(57) ABSTRACT

A combined brush/labyrinth tooth seal is provided between a gas shield and the fan tips in the ventilation system of an electrical generator. At least a pair of brush seals straddle a labyrinth tooth providing a close or zero radial clearance with the tips of the fan blades. The brush seals are provided in two double-row bi-directional form. In one embodiment, the brush bristles are slanted toward the fan in a generally axially opposite direction. In a further embodiment, the slanted brush seals engage either the opposite sides of the fan blades or the fan blade tips.

21 Claims, 5 Drawing Sheets

SEALING APPARATUS FOR ELECTRICAL GENERATOR VENTILATION SYSTEM

BACKGROUND OF THE INVENTION

The present invention relates generally to sealing apparatus for a ventilation system for an electrical generator and particularly relates to sealing apparatus for generator cooling fans using non-metallic brush seals at fan blade tips for eliminating or minimizing leakage flows and enhancing fan efficiency.

During normal operations of electrical generators, heat is generated in conducting coils, rotor and stator cores, frame, etc., due to the copper, iron, windage and load losses. To ensure reliable operation of the generator, such produced heat must be dissipated efficiently from the generator by a ventilation system. Ventilating fans mounted at the rotor shaft ends play a critical role in the ventilation system by driving cold gas to cool the stator and rotor windings and cores and thus assure operating temperatures of the generator below allowable limits.

In a typical generator, with a ventilating fan mounted on an end of the rotor, cooling gas flows essentially into four branches of the generator: the rotor stator gap, the rotor sub-slot, outside space block and ventilating holes to a heat exchanger. As the cooling gas leaves the fan and approaches the rotor, the rotating surfaces of the end region of the rotor act to accelerate the gas to rotor speed. This facilitates pumping of the cooling gas passing through the armature bars. The cooling flow splits at the front of the centering ring to enter the rotor sub-slot and rotor stator gap, respectively. Then all of the cooling gas passes through the stator core in a radially outward direction. Because all of the hot gas of the rotor must pass through the stator core, the distribution of gas through both rotor and stator are interrelated and will affect the stator operating temperatures. To best cool the ends of the armature bars near the series loop caps, the gap between the edges of armature bars and the tip of a gas shield is used to adjust the flow rate.

The end winding region is located at the two ends of the generator. A large number of parts and components are in the region, including a ventilating fan, a gas shield, armature bars, a retaining ring, a centering ring, rotor end windings, power connection rings and a stator flame. As a result, the flow field in this region is considerably complex. With large-scale and high-powered generators, the cooling flow at the end winding region is particularly important because it may result in local hot spots in the end winding bars and a large ventilating windage loss. How well the armature winding of the generator is cooled has a significant influence on the overall size of a synchronous generator.

The design of a generator fan is based on a required pressure at a specified flow. The fan must run at rotor shaft speed and the dimensions are limited by the geometry of the end structure of the generator. The fan efficiency is directly dependent upon the ability of the seals to prevent leakage. Generators typically employ rigid, triangularly-shaped teeth, i.e., labyrinth-type seals, to control leakage between the rotating fan blades and the stationary gas shield. A radial clearance is maintained between the fan blade tips and the labyrinth teeth of the gas shield to avoid damage to the fan blades. However, this clearance results in leakage flows and thus a lowering of the efficiency of the fan. Accordingly, there is a need for an enhanced seal to facilitate reduction in leakage flows between the fan tips and generator housing in a cost-effective and reliable manner.

BRIEF DESCRIPTION OF THE INVENTION

In accordance with a preferred embodiment of the present invention, there is provided a combined brush seal such as double-row, bi-directional or slanted brush seals, and a conventional labyrinth seal which eliminates or minimizes gas leakage flows through the gap between the fan blades and the gas shield. The brush seals are formed of non-metallic materials such as plastic fibers and/or Kevlar™. Non-metallic brush seals afford low bristle stiffness thereby facilitating a zero radial clearance between the fan blade tips and the brush bristles. Also, with low stiffness the cant angle is no longer a controlled design parameter since the cant angle is established naturally by the blade rotation. Further, the low stiffness and non-metallic bristles accommodate radial shaft excursions without damage to the shaft or seal.

In a preferred embodiment, two double-row bi-directional brush seals are mounted on a brush seal holder on opposite sides of labyrinth seal teeth. The brush seal holder is secured to the generator housing, particularly the gas shield, to form an annular seal about the tips of the fan blade at the end of the rotor. With the labyrinth teeth between the brush seals, vortex flows introduced from the upstream brush seal do not influence significantly the downstream brush seal. To further enhance sealing, notches may be formed on the tips of the fan blades to introduce a small radial step on each side of the blade. Thus, the tips of the bristle packs lie at different radial positions, affording increased sealing effectiveness. Slanted brush seals may also be utilized adjacent the sides of the fan blades. With the bristles inclined toward opposite sides of the fan, any leakage flow requires essentially two 90° turns in opposite directions which substantially improves sealing effectiveness. Also, the bristles of the slanted brush seals may be slanted upstream toward the leakage flow to increase resistance to the leakage flow. The labyrinth teeth may likewise be slanted toward the leakage flow.

In a preferred embodiment according to the present invention, there is provided sealing apparatus comprising a rotary component mounted for rotation about an axis, a stationary component surrounding the rotary component, a seal between outer diameter margins of the rotary component and the surrounding stationary component, the seal including an annular labyrinth seal carried by the stationary component and having a plurality of teeth spaced from outer margins of the rotary component and an annular brush seal on each of axially opposite sides of the labyrinth seal teeth, the brush seals having bristles extending toward the margins of the rotary component and terminating in tips adjacent the margins whereby leakage through any gap between the margins of the rotary component and the stationary component are minimized or eliminated.

In a further preferred embodiment according to the present invention, there is provided sealing apparatus for a ventilation system in an electrical generator having a rotor, a stator and a housing for the rotor and stator, comprising a fan for mounting on an end portion of the rotor with portions of the generator housing surrounding the fan, a seal between outer diameter margins of the fan and the surrounding housing portions, the seal including an annular labyrinth seal carried by the surrounding housing portion and having a plurality of teeth spaced from outer margins of the fan and an annular brush seal on each of the opposite sides of the labyrinth seal teeth, the brush seals having bristles extending toward the margins of the fan and terminating in tips adjacent the fan margins whereby leakage through any gap between the margins of the fan and the housing portion are minimized or eliminated.

DETAILED DESCRIPTION OF THE INVENTION

Figure 1:
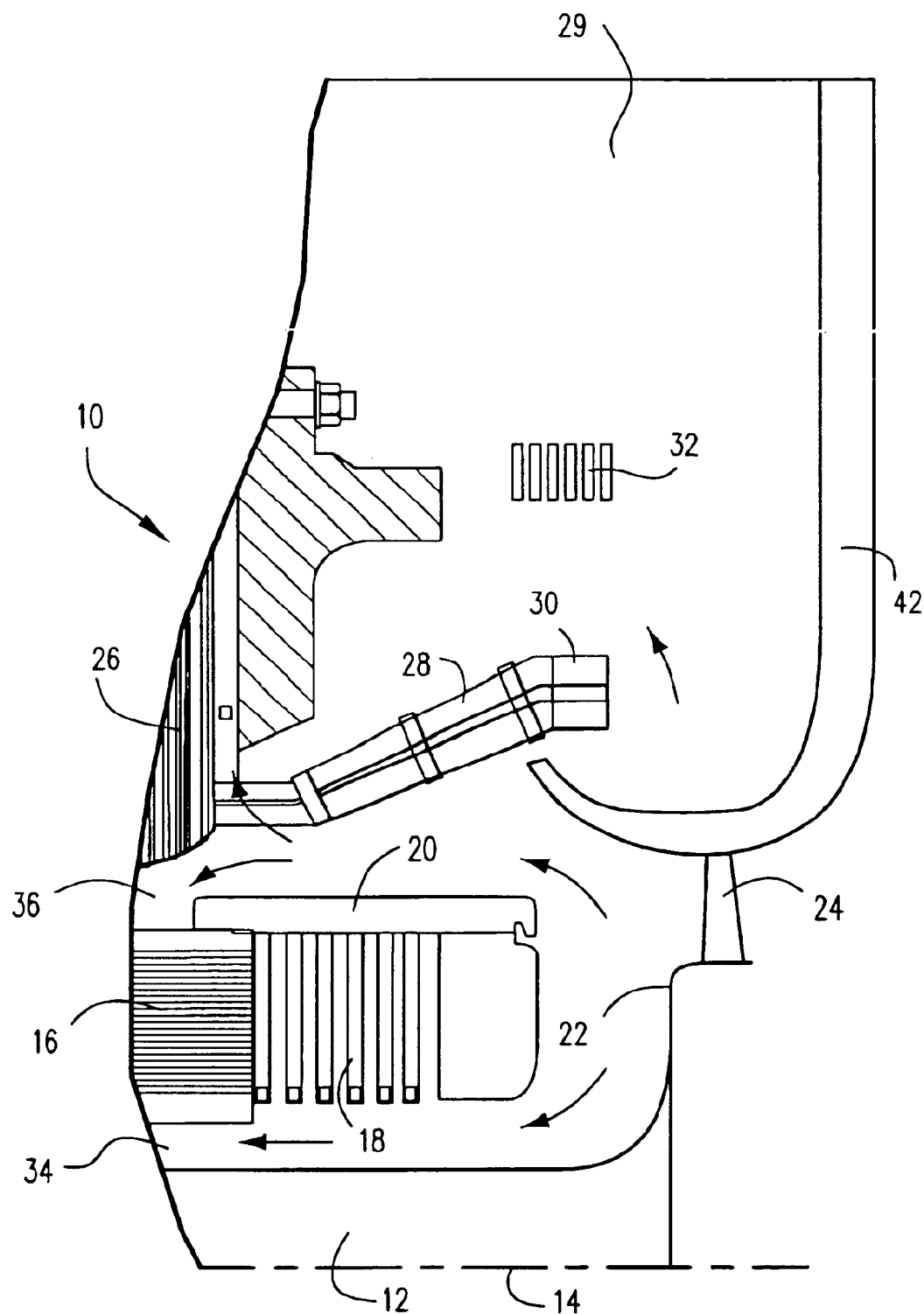
FIG. 1 is a fragmentary cross-sectional view of an upper half of an electrical generator adjacent one end thereof.

Referring now to the drawings, particularly to FIG. 1, there is illustrated an end portion of an electrical generator, generally designated 10. Generator 10 includes a rotor 12 rotatable about an axis 14 and including rotor windings 16, rotor coil end turns 18, a retaining ring 20, and a fan 22 mounting fan blades 24, all within a housing 29. The rotor also includes a stator 26 having end armature bars 28, series loop caps 30 and connection rings 32. The rotor 12 also includes a rotor sub-slot 34. An air gap 36 appears between the stator 26 and the rotor windings 16. It will be appreciated that the cooling gas entering through the fan splits for flow about the retaining ring and rotor coil end turns into the rotor sub-slot and air gap where the cooling gas passes through the stator core in a radial outward direction. The cooling gas also flows through the armature bars and through ventilation openings, not shown, for passage through heat exchangers, also not shown. Because of the large number of variously shaped component parts in the end winding region, the flow field in this region is considerably complex. Consequently, it is important that local hot spots in the end winding bars be avoided.

Figure 2:
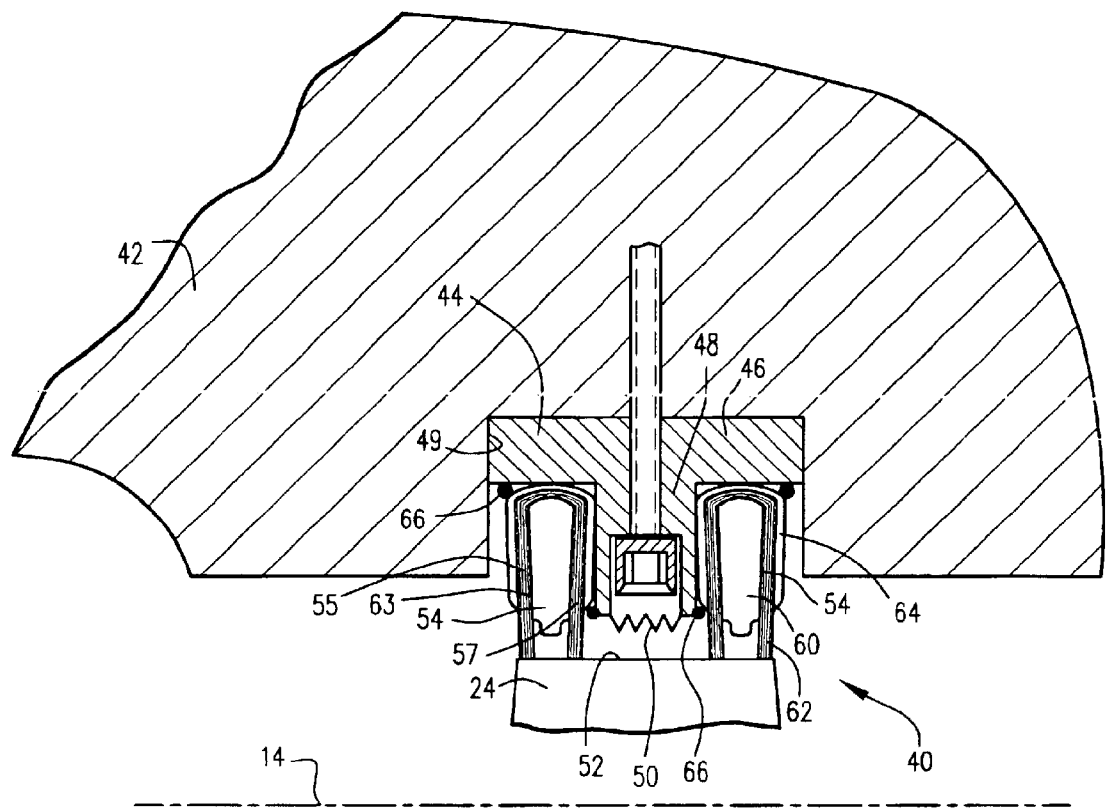
FIG. 2 is an enlarged fragmentary cross-sectional view illustrating sealing apparatus about tips of the fan in accordance with a preferred embodiment of the present invention.
Figure 2:
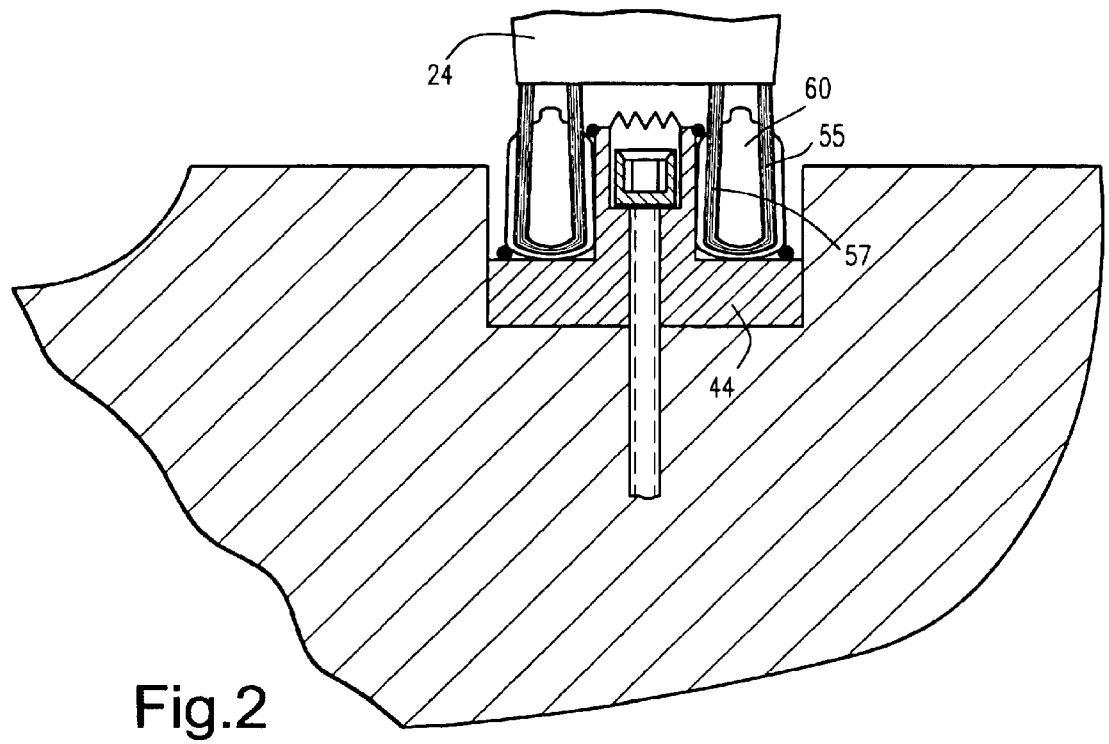

Referring now to FIG. 2, a seal, generally designated 40, is mounted on a gas shield 42 for sealing about the outer margins or tips of the fan blades 24. Seal 40 includes arcuate segments secured to the gas shield 42. The segments may be provided in various lengths, for example, two 180° segments or four 90° segments, or otherwise for convenience of application. It will be appreciated, however, that the segments form an annular seal about the tips of the fan blades 24. The seal 40 includes an arcuate seal holder 44 which has a generally T-shaped cross-sectional configuration including a pair of flanges 46 and a radially extending stem 48. The seal holder 44 is secured in an arcuate groove 49 formed in the gas shield 42 by a plurality of circumferentially spaced bolts threaded to the gas shield 42.

The radial inward face of the stem 48 of holder 44 is provided with a plurality of labyrinth seal teeth 50 spaced from the outer margins or tips 52 of the fan blade 24. Double-row bi-directional brush seals 54 are positioned on opposite sides of the labyrinth seal teeth 50, i.e., brush seals 54 straddle the labyrinth seal teeth 50. Each brush seal 54 includes a pair of axially spaced rows of bristles 55 and 57. While different types of brush seals may be employed, the preferred embodiment includes a central bristle carrier 60 about which bristles 62 extend along opposite sides and over the top of the bristle carrier 60. The bristles 62 form a bristle pack 63 folded over carrier 60 to form the double row of bristles 55 and 57. A brush seal cover plate 64 overlies the bristles along opposite sides of the brush seal, the cover plate 64 terminating short of the tips of the bristles 62 along opposite sides of the brush seal. Each brush seal is secured to the brush seal holder 44 by any suitable means, e.g., spot-gluing, the glue spots being indicated 66. The brush seals are preferably formed of non-metallic material such as Kevlar™ and/or plastic fibers. It will be appreciated that the tips of the bristles may have a zero radial clearance with the tips of the fan blades which facilitates a reduction in the gas leakage flow past the fan. It will also be appreciated that the upstream brush seal introduces a flow vortex. By locating the labyrinth teeth between the upstream and downstream brush seals, the flow vortex diminishes to the extent that the downstream brush seal is not influenced by the flow vortex.

Figure 3:
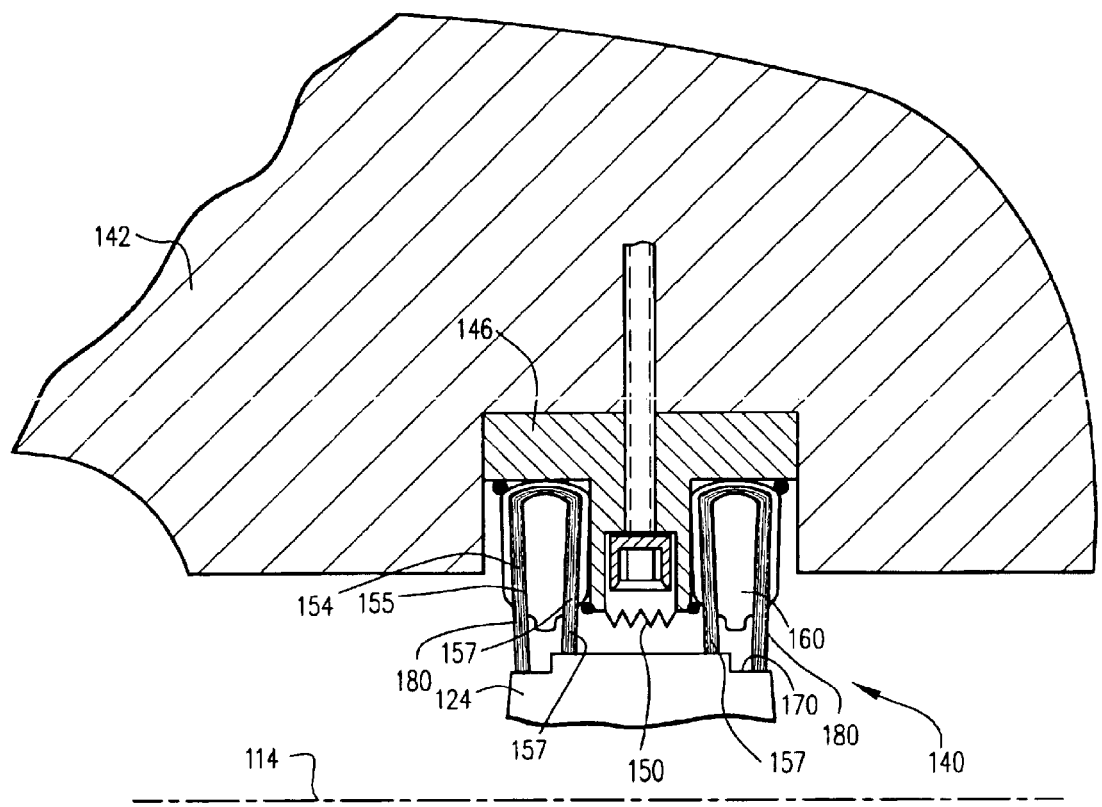
FIG. 3 is a view similar to FIG. 2 illustrating a further embodiment of the sealing apparatus hereof.
Figure 3:
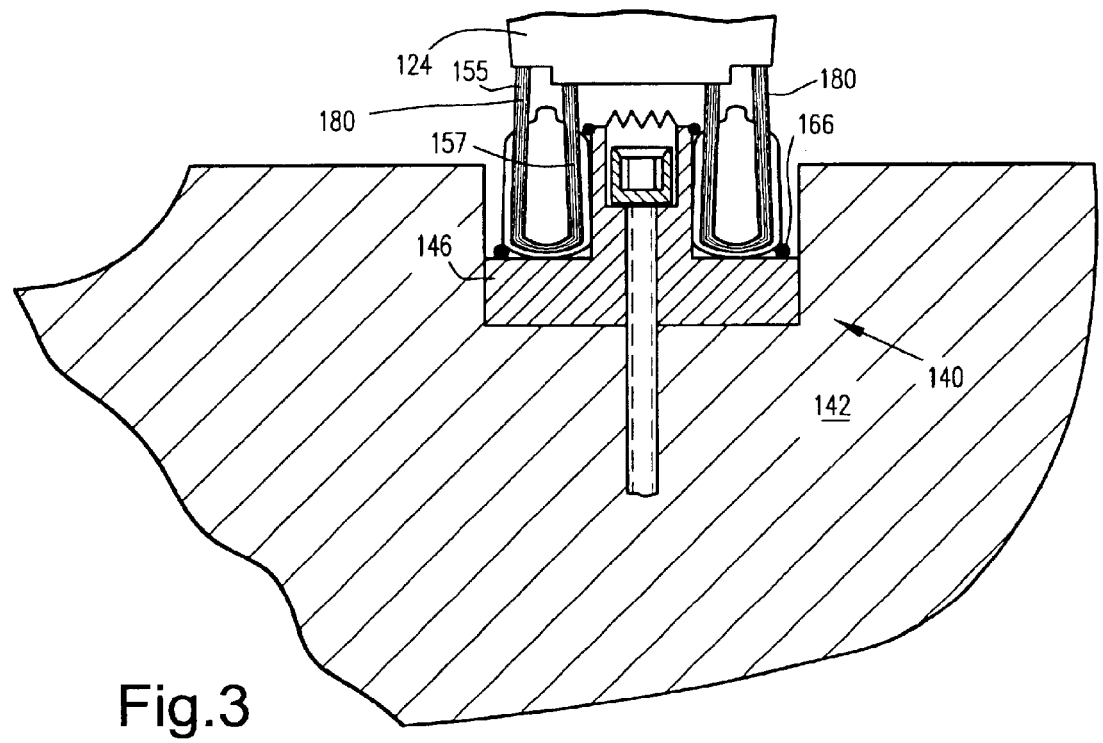

Referring now to FIG. 3, wherein like reference numerals are applied to like parts as in FIG. 2, preceded by the numeral 1, the double-row bi-directional brush seals 154 on opposite sides of the labyrinth teeth 150 may have non-equal lengths of bristles. For example, the axially outermost row of bristles 180 of each of the brush seals terminates in tips radially inwardly of the tips of the innermost row of bristles 182 of each brush seal. Also, the fan blades 124 are notched to introduce a recess or radial step 170 into the fan blade 124 to accommodate the radially inwardly longer bristle tips. By introducing bristles having tips terminating at different radial locations, the resistance to gas leakage increases and sealing effectiveness is improved.

Figure 4:
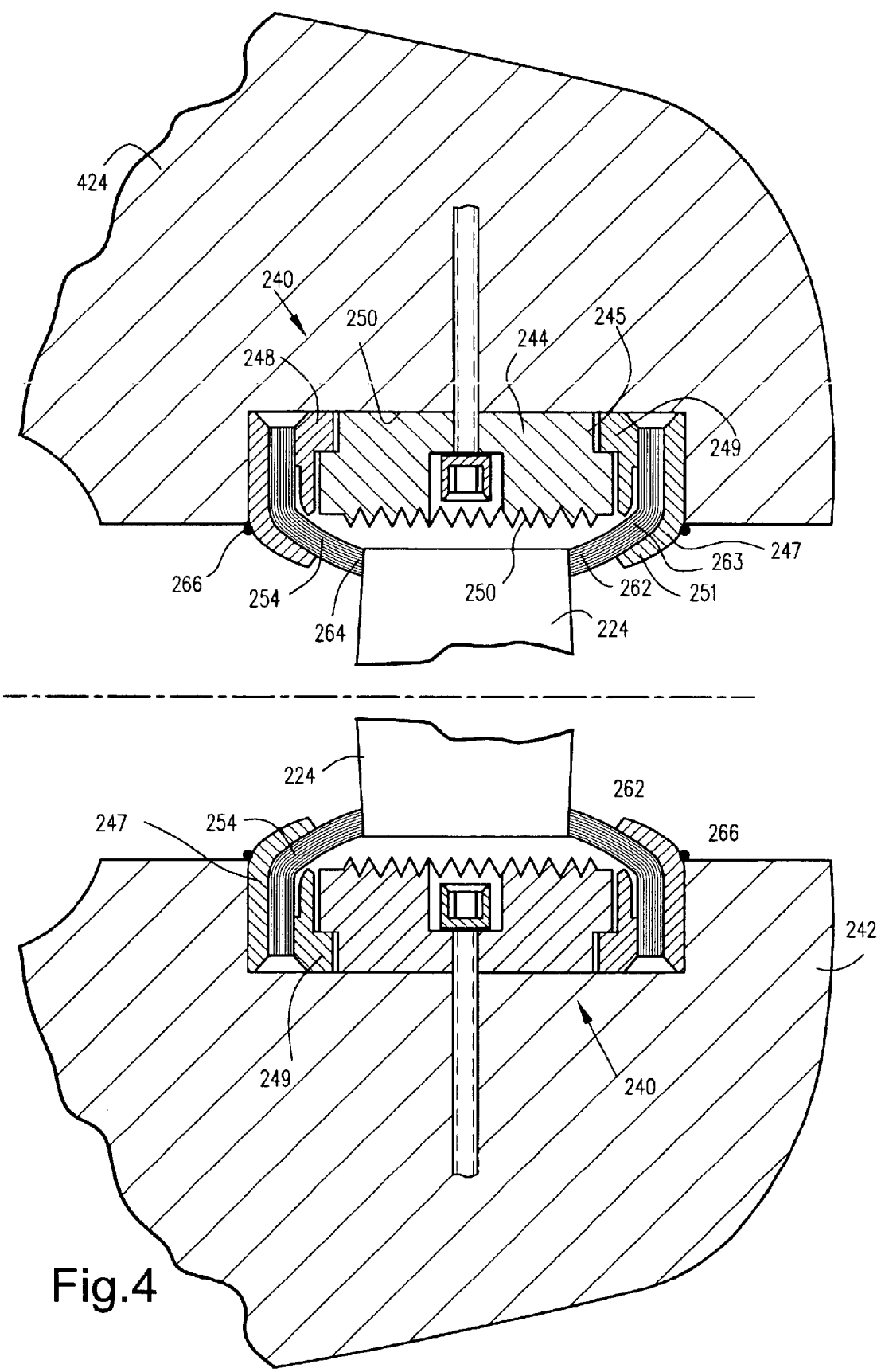
FIG. 4 is a view similar to FIG. 2 illustrating a still further embodiment of the sealing apparatus hereof.
Figure 5:
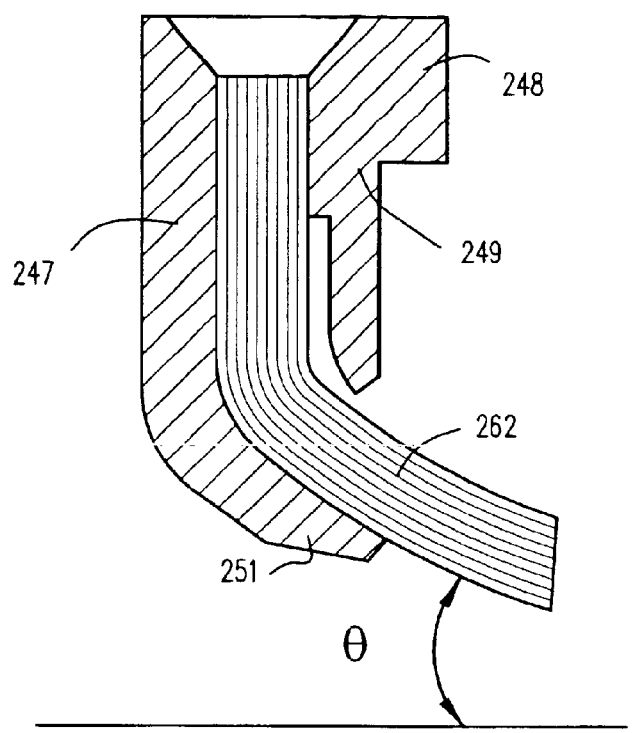
FIG. 5 is an enlarged cross-sectional view of a portion of the brush seal apparatus of FIG. 4.

Referring now to the embodiment hereof illustrated in FIG. 4, wherein like reference numerals are applied to like parts as in FIG. 2 preceded by the numeral 2, the brush seals 254 are mounted on opposite sides of the fan blades 224 with the bristles 262 of each bristle pack 263 slanted in an axial direction toward the fan blades 224. As illustrated in FIG. 5, the bristle tips form an angle θ with the axis of the machine, the angle θ being less than 45°. Thus, the tips of the bristles 262 of the brush seals 254 lie in close proximity to or have zero axial clearance with the opposite sides of the fan blades 24. The seal 240 also includes a labyrinth seal comprised of a plurality of labyrinth seal teeth 250 formed on a seal holder 244. As in the prior embodiment, the seal holder 244 is bolted to the gas shield 242. In this form, the seal holder 244 includes a groove 245 along opposite sides extending the length of the arcuate seal holder 244.

Each brush seal 254 includes a backing plate 247 and a spacer plate 249. The spacer plate includes an axially projecting flange 248 for seating in the groove 245 of the seal holder 244. Thus, the brush seals are captured between the seal holder 244 and the sides of the groove 250 in which the brush seals and labyrinth seal reside. As best illustrated in FIG. 5, the backing plate 247 includes a curved tip 251 supporting the bristles 262 in their slanted configuration directed generally axially toward the fan blades 224. The brush seals 254 are secured preferably by spot-gluing, e.g., at 266. The angularly directed bristles of the brush seals cause the leakage flow to turn approximately 90° to flow into the gap between the blade tips and the labyrinth teeth and then to turn again approximately 90° to exit from the gap past the downstream brush seal. Thus, the combined slanted brush seals and labyrinth seal provide high sealing effectiveness. Additionally, the impact of shaft excursions on the fan sealing is eliminated. The radial clearance between the blade tips and the labyrinth seal may be maintained at about 0.060 inches ±0.010 inch as customary.

Figure 6:
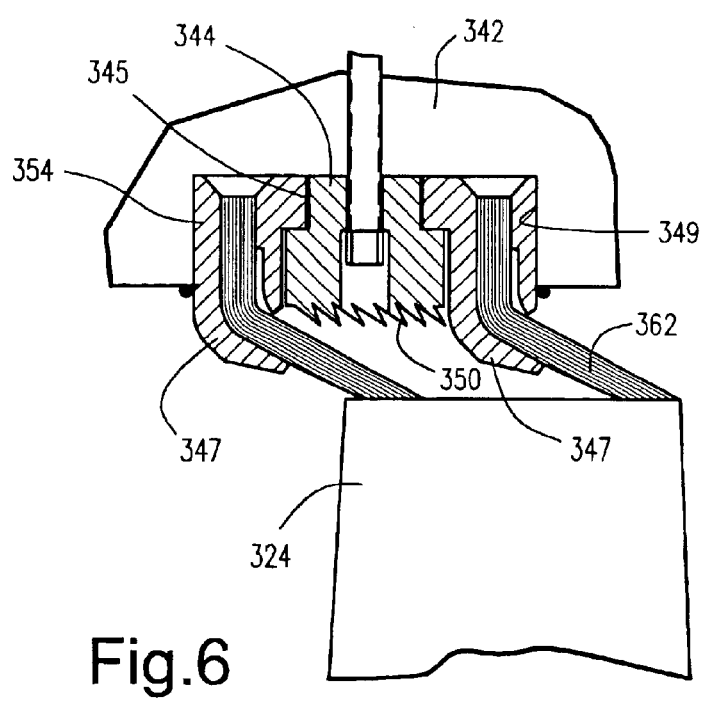
FIG. 6 is a cross-sectional view of a still further form of sealing apparatus in accordance with a preferred embodiment of the present invention.

Referring now to a further embodiment of the present invention illustrated in FIG. 6, wherein like reference numerals are applied to like parts as in the embodiment of FIG. 2, preceded by the numeral 3, similar slanted brush seals as in FIGS. 4 and 5 may be utilized and directed in the same generally axial direction. Thus, a similar brush seal holder 344 with lateral grooves 345 mounts a pair of brush seals 354 in the groove 350 of the gas shield 342. To increase the resistance of leakage flow, the slanted bristles 362 are directed towards the leakage flow, i.e., directed in an upstream direction. Additionally, the slanted teeth 350 of the labyrinth seal teeth 350 are likewise slanted in an upstream direction. Thus, the backing plates 347 for each of the brush seals lies on the same axial side of the bristles 362 such that the slanted bristles extend in an upstream, generally axial direction for clearing or having a zero radial clearance with the tips of the fan blade 24.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Sealing apparatus comprising:
   a rotary component mounted for rotation about an axis and having circumferentially extending non-continuous surfaces;
   a stationary component surrounding said rotary component;
   a seal between the non-continuous surfaces of the rotary component and the surrounding stationary component;
   said seal including an annular labyrinth seal carried by said stationary component and having a plurality of teeth spaced from outer margins of the rotary component and an annular brush seal on each of axially opposite sides of the labyrinth seal teeth, said brush seals having bristles extending toward the non-continuous surfaces of the rotary component and terminating in tips adjacent the said surfaces whereby leakage through any gap between the surfaces of the rotary component and the stationary component are minimized or eliminated.

2. Apparatus according to claim 1 including a combined brush and labyrinth tooth holder mounted on said stationary component.

3. Apparatus according to claim 1 wherein each said brush seal on each side of the teeth comprises first and second axially spaced rows of bristles separated one from the other by a bristle carrier.

4. Apparatus according to claim 3 wherein at least one of the brush seals on each side of the labyrinth teeth has bristles inclined in an axial direction.

5. Sealing apparatus comprising:
   a rotary component mounted for rotation about an axis;
   a stationary component surrounding said rotary component;
   a seal between outer diameter margins of the rotary component and the surrounding stationary component;
   said seal including an annular labyrinth seal carried by said stationary component and having a plurality of teeth spaced from outer margins of the rotary component and an annular brush seal on each of axially opposite sides of the labyrinth seal teeth, said brush seals having bristles extending toward the margins of the rotary component and terminating in tips adjacent the said margins whereby leakage through any gap between the margins of the rotary component and the stationary component are minimized or eliminated, each said brush seal on each side of the teeth comprising first and second axially spaced rows of bristles separated one from the other by a bristle carrier, and including a brush seal cover plate overlying each brush seal carrier and portions of the double row of bristles on each of the opposite sides of the labyrinth seal teeth.

6. Sealing apparatus comprising:
   a rotary component mounted for rotation about an axis;
   a stationary component surrounding said rotary component;
   a seal between outer diameter margins of the rotary component and the surrounding stationary component;
   said seal including an annular labyrinth seal carried by said stationary component and having a plurality of teeth spaced from outer margins of the rotary component and an annular brush seal on each of axially opposite sides of the labyrinth seal teeth, said brush seals having bristles extending toward the margins of the rotary component and terminating in tips adjacent the said margins whereby leakage through any gap between the margins of the rotary component and the stationary component are minimized or eliminated, each said brush seal on each side of the teeth comprises first and second axially spaced rows of bristles being separated one from the other by a bristle carrier, the tips of a first row of bristles of each brush seal on each of the opposite sides of the labyrinth teeth terminating radially inwardly beyond tips of a second row of the bristles of each brush seal.

7. Apparatus according to claim 6 wherein the rotary component is recessed radially inwardly to receive the tips of said first row of bristles.

8. Sealing apparatus comprising:
   a rotary component mounted for rotation about an axis;
   a stationary component surrounding said rotary component;
   a seal between outer diameter margins of the rotary component and the surrounding stationary component;
   said seal including an annular labyrinth seal carried by said stationary component and having a plurality of teeth spaced from outer margins of the rotary component and an annular brush seal on each of axially opposite sides of the labyrinth seal teeth, said brush seals having bristles extending toward the margins of the rotary component and terminating in tips adjacent the said margins whereby leakage through any gap between the margins of the rotary component and the stationary component are minimized or eliminated, said brush seal on each side of the teeth comprising first and second axially spaced rows of bristles separated one from the other by a bristle carrier, tips of said first row of bristles of each brush seal on each of the opposite sides of the labyrinth teeth terminating radially inwardly beyond tips of said second row of bristles of each brush seal, said rotary component having notches about outer margins thereof for receiving the tips of the first rows of bristles.

9. Sealing apparatus comprising:
   a rotary component mounted for rotation about an axis;
   a stationary component surrounding said rotary component;
   a seal between outer diameter margins of the rotary component and the surrounding stationary component;
   said seal including an annular labyrinth seal carried by said stationary component and having a plurality of teeth spaced from outer margins of the rotary component and an annular brush seal on each of axially opposite sides of the lab labyrinth seal teeth, said brush seals having bristles extending toward the margins of the rotary component and terminating in tips adjacent the said margins whereby leakage through any gap between the margins of the rotary component and the stationary component are minimized or eliminated, the brush seals on opposite sides of the labyrinth teeth having bristles inclined in opposite axial directions.

10. Sealing apparatus comprising:

a rotary component mounted for rotation about an axis;

a stationary component surrounding said rotary component;

a seal between outer diameter margins of the rotary component and the surrounding stationary component;

said seal including an annular labyrinth seal carried by said stationary component and having a plurality of teeth spaced from outer margins of the rotary component and an annular brush seal on each of axially opposite sides of the labyrinth seal teeth, said brush seals having bristles extending toward the margins of the rotary component and terminating in tips adjacent the said margins whereby leakage through any gap between the margins of the rotary component and the stationary component are minimized or eliminated, the brush seals on each of the opposite sides of the labyrinth teeth having bristles inclined in the same axial direction.

11. Sealing apparatus for a ventilation system in an electrical generator having a rotor, a stator and a housing for the rotor and stator, comprising:

a fan for mounting on an end portion of the rotor with portions of the generator housing surrounding the fan;

a seal between outer diameter margins of the fan and the surrounding housing portions;

said seal including an annular labyrinth seal carried by said surrounding housing portion and having a plurality of teeth spaced from outer margins of the fan and an annular brush seal on each of the opposite sides of the labyrinth seal teeth, said brush seals having bristles extending toward the margins of the fan and terminating in tips adjacent the fan margins whereby leakage through any gap between the margins of the fan and the housing portion are minimized or eliminated.

12. Apparatus according to claim 11 including a combined brush and labyrinth tooth holder mounted on said surrounding housing portion.

13. Apparatus according to claim 11 wherein each said brush seal on each side of the teeth comprises first and second axially spaced rows of bristles separated one from the other by a bristle carrier.

14. Apparatus according to claim 13 including a brush seal cover plate overlying each brush seal carrier and portions of the double row of bristles on each of the opposite sides of the labyrinth seal teeth.

15. Apparatus according to claim 13 wherein tips of a first row of bristles of each brush seal on each of the opposite sides of the labyrinth teeth terminate radially inwardly beyond tips of a second row of the bristles of each brush seal.

16. Apparatus according to claim 15 wherein tips of the fan are recessed radially inwardly to receive the tips of said first rows of bristles.

17. Apparatus according to claim 11 wherein said fan includes a plurality of circumferentially spaced blades.

18. Apparatus according to claim 17 wherein said brush seal on each side of the teeth comprises first and second axially spaced rows of bristles separated one from the other by a bristle carrier, tips of said first row of bristles of each brush seal on each of the opposite sides of the labyrinth teeth terminating radially inwardly beyond tips of said second row of bristles of each brush seal, said fan blades having notches in tips thereof for receiving the tips of the first rows of bristles.

19. Apparatus according to claim 11 wherein at least one of the brush seals on one side of the labyrinth teeth has bristles inclined in an axial direction and extending toward one side of said fan.

20. Apparatus according to claim 11 wherein the brush seals on opposite sides of the labyrinth teeth have bristles inclined in opposite axial directions and extending toward opposite sides of the fan, respectively.

21. Apparatus according to claim 11 wherein the brush seals on each of the opposite sides of the labyrinth teeth have bristles inclined in the same axial direction.

* * * * *